(12) United States Patent
Shimizu et al.

(10) Patent No.: US 8,217,265 B2
(45) Date of Patent: Jul. 10, 2012

(54) ELECTRICAL CONNECTION PARTS

(75) Inventors: Isanori Shimizu, Makinohara (JP); Shinobu Suzuki, Makinohara (JP)

(73) Assignee: Yazaki Corporation, Tokyo (JP)

( * ) Notice: Subject to any disclaimer, the term of this patent is extended or adjusted under 35 U.S.C. 154(b) by 354 days.

(21) Appl. No.: 12/498,825

(22) Filed: Jul. 7, 2009

(65) Prior Publication Data

US 2010/0044066 A1  Feb. 25, 2010

(30) Foreign Application Priority Data

Aug. 19, 2008  (JP) .................................. 2008-211207

(51) Int. Cl.
*H02G 5/00* (2006.01)
(52) U.S. Cl. .................. 174/68.2; 174/70 B; 174/71 B; 174/88 B; 174/99 B; 174/133 B; 439/210; 361/624
(58) Field of Classification Search .................. 174/68.2, 174/70 B, 71 B, 72 B, 88 B, 99 B, 133 B; 439/210.212; 361/624
See application file for complete search history.

(56) References Cited

U.S. PATENT DOCUMENTS

| | | | | |
|---|---|---|---|---|
| 7,091,417 B1 * | 8/2006 | Jur et al. | ...................... | 174/68.2 |
| 7,449,635 B2 * | 11/2008 | Wiant | .......................... | 174/68.2 |
| 7,759,577 B1 * | 7/2010 | Morales | ....................... | 174/68.2 |
| 7,830,648 B2 * | 11/2010 | Strong et al. | .................. | 361/624 |

FOREIGN PATENT DOCUMENTS

| | | |
|---|---|---|
| JP | 2000-224733 A | 8/2000 |
| JP | 2001-223459 A | 8/2001 |
| JP | 2002-078155 A | 3/2002 |
| JP | 2004-032911 A | 1/2004 |

* cited by examiner

*Primary Examiner* — Dhirubhai R Patel
(74) *Attorney, Agent, or Firm* — Sughrue Mion, PLLC (57) ABSTRACT

An electrical connection part having a resin case including a window, a plurality of bus bars, at least one of which includes a buried portion buried in the resin case, an exposed portion extending from and at an angle with an end of the buried portion, and exposed from the window, and a retention reinforcing portion extending from the end in a direction along which the buried portion extends.

10 Claims, 8 Drawing Sheets

FIG. 8  PRIOR ART

ELECTRICAL CONNECTION PARTS

CROSS REFERENCE TO RELATED APPLICATIONS

This application claims priority from Japanese Patent Application No. 2008-211207 filed on Aug. 19, 2008, and the entire subject matter of which is incorporated herein by reference.

TECHNICAL FILED

The present invention is related to an electrical connection parts such as an electrical connection box, and more particularly, to an electrical connection parts formed by incorporating a bus bar for an electrical path into a resin case by insert molding.

BRIEF DESCRIPTION OF RELATED ART

Figure 4:
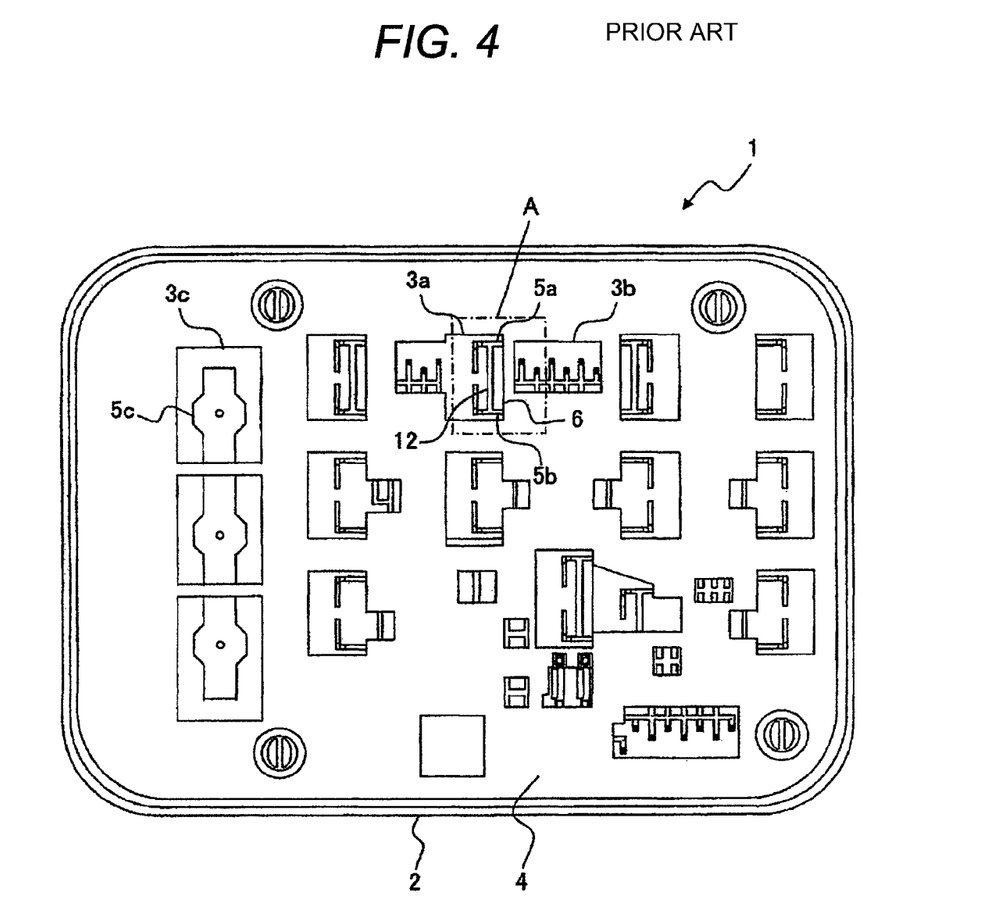
FIG. 4 is an simplified view of a related electrical connection box.
Figure 5:
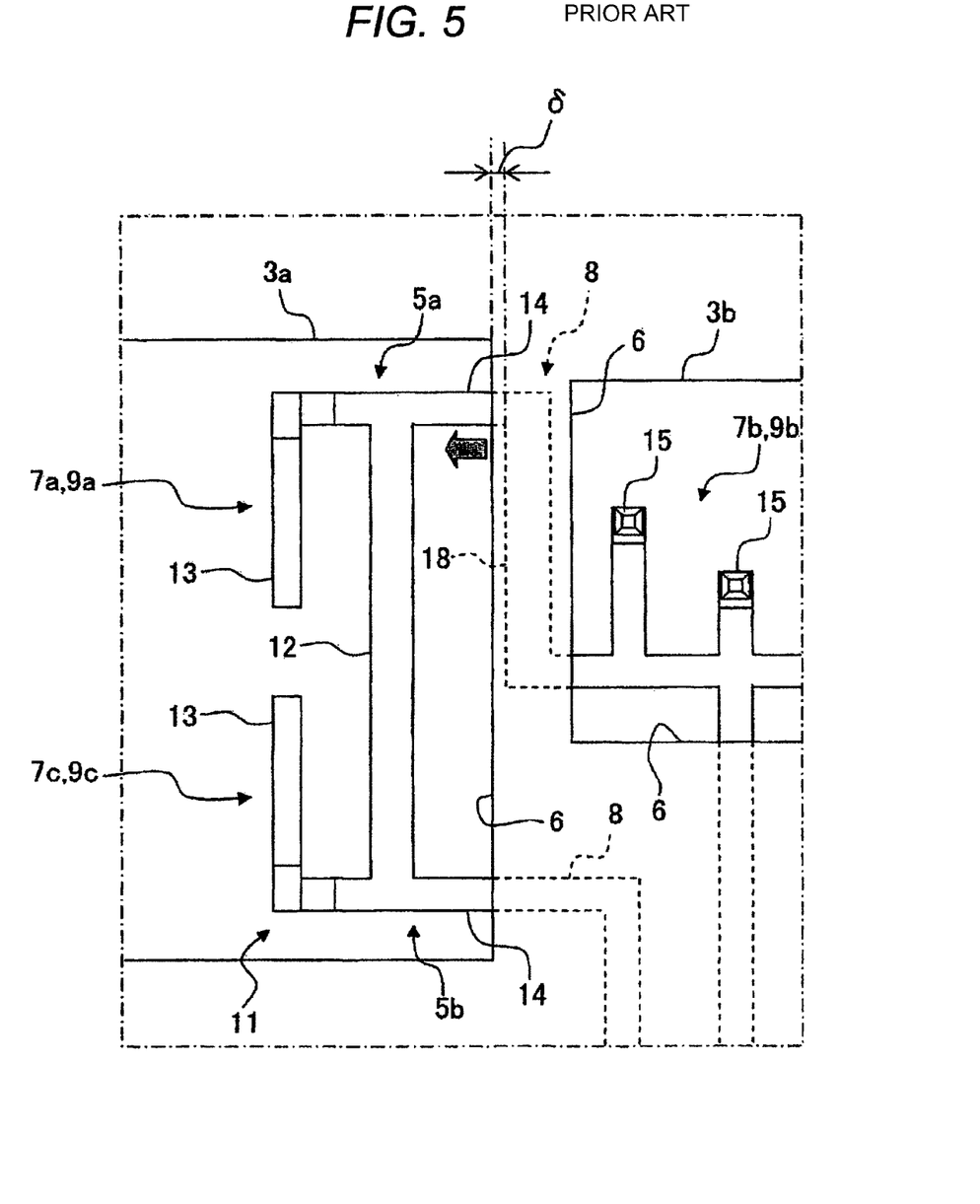
FIG. 5 is an expanded view of an area A of FIG. 4.

There are many types of electrical connection parts such as an electrical connection box. As one example of them, an electrical connection box of insert-molding-type is known. This type of electrical connection box has a circuit pattern formed in a resin case by insert molding a bus bar for an electrical path into a resin case. An exemplary configuration of the insert-molding-type electrical connection box is shown in FIGS. 4 to 6C. FIG. 4 is a plan view of the electrical connection box, FIG. 5 is a expansion of an area A of FIG. 4, and FIGS. 6A-6C are views of a bus bar and a bus bar unit of the area A.

The electrical connection box 1 includes a resin case 2. The resin case 2 includes a plate like insert portion 4 which has a plurality of polygonal windows 3a, 3b, 3c formed in a predetermined arrangement. Each window has one or two exposed projection edges 6, as shown in FIG. 5. In the insert portion 4, a plurality of bus bars 5a, 5b formed in a variety of electrical path patterns are incorporated by insert molding. As shown in FIG. 5, each bus bar has an exposed portion 7a, 7b, 7c which is exposed and projected from the inside of the resin of the insert portion 4 to the windows at the exposed projection edges 6, and a buried portion 8 (shown with dot lines) which is buried in the inside of the resin of the insert portion 4 at the exposed projection edges 6. Each bus bar includes some types of electrical contact portion 9a, 9b, 9c. These electrical contact portions 9a, 9b, 9c are exposed to the windows 3a, 3b as the exposed portions 7a, 7b, 7c, respectively.

Figure 6A:
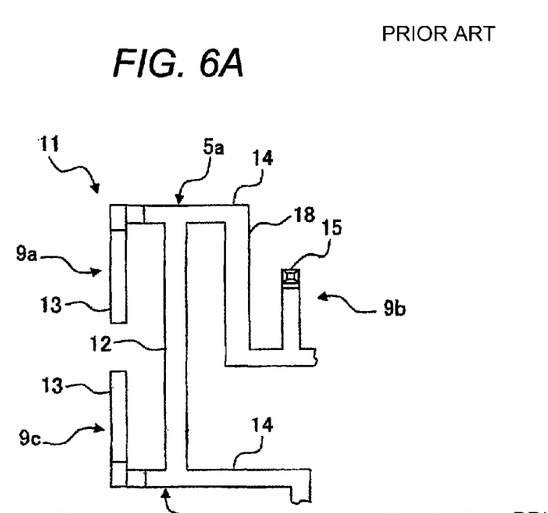

Incorporation of bus bars 5a, 5b into the resin case 2 in such an electrical connection box 1 of insert-molding type is performed by use of a bus bar unit 11, a part of which is expandedly shown in FIGS. 5 and 6A. The bus bar unit 11 is formed by provisionally connecting each bus bar which corresponds to electrical path of circuit pattern required in the electrical connection box by a connecting portion 12. The bus bar unit 11 is incorporated into the insert portion 4 by insert molding so as to form the exposed portions 7a, 7b, 7c and the buried portions 8 for each bus bar 5a, 5b as described above. After the incorporation, the connection portion 12 which is exposed to the window 3a is cut and the bus bars 5a, 5b are separated into a required condition so as to form an electrical path of a predetermined circuit pattern in the resin case 2.

In a part of the bus bar unit 11 shown in FIG. 5, the bus bar 5a includes the exposed portions 7a and 7b, and the bus bar 5b includes the exposed portion 7c which is exposed to the window 3a shared with the bus bar 5a. The exposed portions 7a, 7b, and 7c correspond to the electrical contact portion 9a, 9b, and 9c respectively.

The exposed portion 7a and 7c (the electrical contact portion 9a and 9c) have symmetrical structure and each of which includes a terminal portion 13 and an orthogonal projection portion 14. The terminal portion 13 is parallel to the exposed projection edge 6 of the window 3a, and is parallel to the plate like insert portion 4. Therefore, the terminal portion 13 is a laying type terminal. On the other hand, the orthogonal projection portion 14 continues to the terminal portion 13 so as to be perpendicular thereto. Therefore, the orthogonal projection portion 14 projects to the window 3a so as to be perpendicular to the exposed projection edge 6 of the window 3a. The bus bars 5a and 5b are connected by the connection portion 12 which bridges the orthogonal projection portions 14 of the exposed portion 7a and 7c (the electrical contact portion 9a and 9c). Also, the connection portion 12 is positioned at the exposed portion 7a and 7c.

Figure 6B:
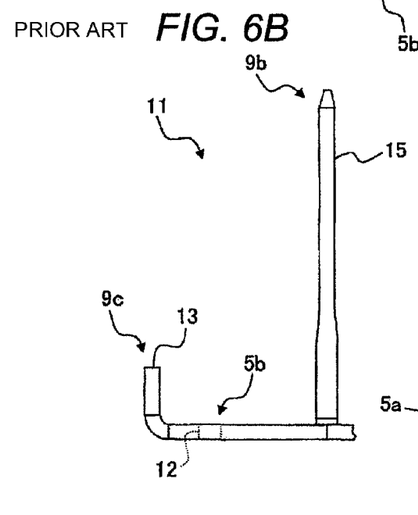
Figure 6C:
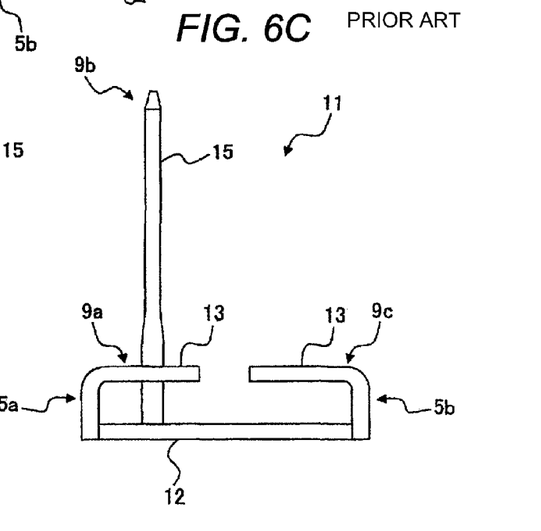

The exposed portion 7b (the electrical contact portion 9b) includes a plurality of terminal portions 15 of standing type which stand perpendicular to the insert portion 14 (see FIGS. 6B and 6C). Each terminal portion 15 is exposed to the window 3b.

Figure 7:
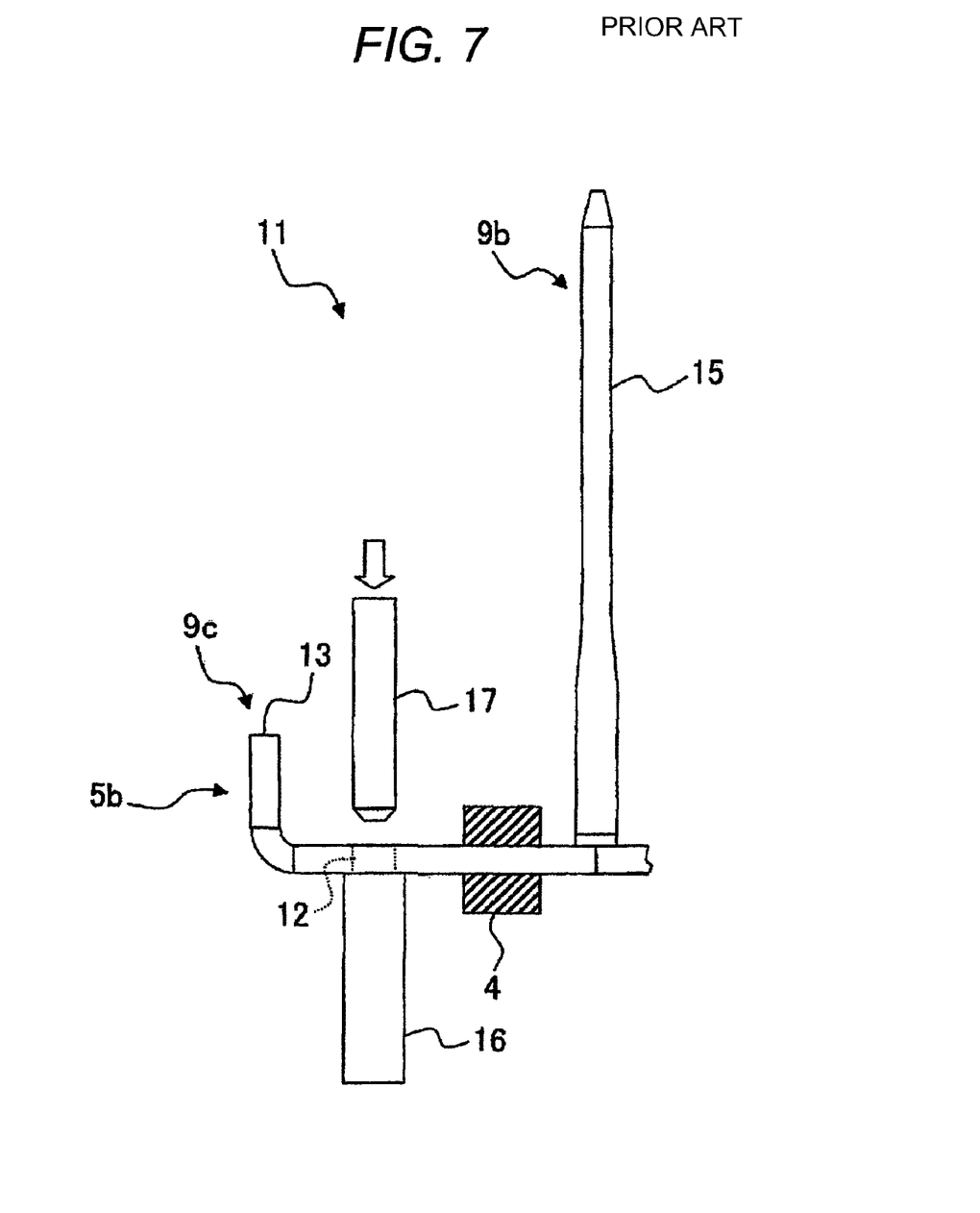
FIG. 7 is a view of a cut process for a connecting portion of the bus bar unit.
Figure 8:
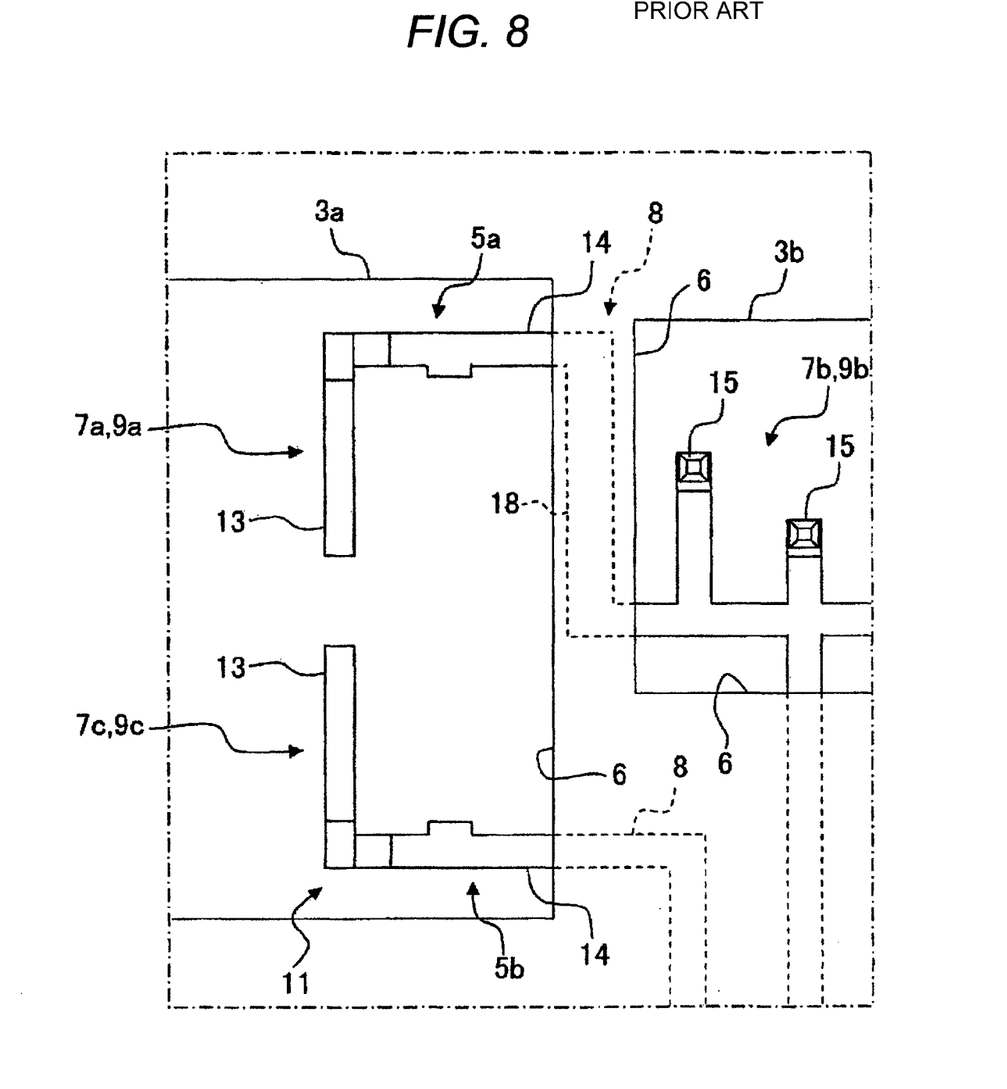
FIG. 8 is a view of the area A of FIG. 4 after the cut process.

FIG. 7 shows the cut process for the connecting portion 12 which connects the bus bars 5a and 5b of the bus bar unit 11. In this cut process, the connecting portion 12 that is incorporated into the insert portion 4 is supported by a dice 16 from its backside. After the dice 16 is set, the connecting portion 12 is cut by moving down a punch 17 against the connecting portion 12. According to this connection cut process, the connecting portion 12 is removed and the bus bars 5a and 5b are separated. Thus, the electrical path of the required circuit pattern is obtained.

The electrical connection box 1 such as described above has a disadvantage that a part of the buried portion 8 is exposed from the resin of the insert portion 4 due to the cut process for the connecting portion 12. During the cut process, the punch 17 generates a force to pull the buried portion 8 that causes the exposure of the buried portion 8. Especially, the exposure of the buried portion 8 tends to occur at a portion of the bus bar structure shown in FIG. 5 (See a solid bold arrow in FIG. 5).

The buried portion 8 that directly continues to the orthogonal projection portion 14 of the exposed portion 7a of the bus bar 5a includes a connection portion 18. The connection portion 18 is connected to the orthogonal projection portion 14 at a right angle and extended along the exposed projection edge 6 from which the orthogonal projection portion 14 is exposed to the window 3. The connection portion 18 is buried in the insert portion 4 in such a condition that the connection portion 18 is distant from the exposed projection edge 6 in a resin thickness δ. In such a bus bar structure, the resin thickness δ is sometimes not enough thick to sustain the buried portion 8 inside of the insert portion 4 against the pulling force due to the force generated by the punch 17 to cut the connecting portion 12. In this case, the pulling force works at the connecting portion 18 of the buried portion 8 and causes the buried portion 8 inclined. As a result, a part of the buried portion 18 is exposed to the window 3.

Exemplary descriptions of a related electrical connection boxes and a related electrical connection parts that use a bus bar for an electrical path are shown in JP-2000-224733A and JP-2001-223459A. Also, an exemplary description of a related insert-molding-type electrical box that incorporates a bus bar by insert molding is shown in JP-2004-032911A. Additionally an exemplary description of a related bus bar unit is shown in JP-2002-078155A

SUMMARY

As above described example of a related electrical connection box, the insert-molding-type electrical connection box has a disadvantage that a buried portion is exposed due to cut process of a connecting portion of a bus bar unit. The exposure of the buried portion is undesired condition in view of the quality of the electrical connection parts because a portion which should be buried is exposed. Therefore, it is required to efficiently prevent the buried portion form being exposed.

Exemplary embodiments of the present invention address the above disadvantages and other disadvantages not described above. However, the present invention is not required to overcome the disadvantages described above, and thus, an exemplary embodiment of the present invention may not overcome any of the disadvantages described above.

Accordingly, it is an aspect of the present invention to provide an electrical connection parts of a insert-molding-type which forms an electrical path of a required circuit pattern in a resin case by insert molding a bus bar for the electrical path into the resin case, efficiently prevent an buried portion form being exposed even if an enough resin thickness to isolate the buried portion of the bus bar from a window of the resin case for the bus bar exposure is not obtained.

According to one or more illustrative aspects of the present invention, there is provided an electrical connection parts comprising a resin case including a window and a bus bars, the bus bar includes an buried portion buried in the resin case and having an end; an exposed portion extending from and an angle with the buried portion, and exposed from the window; and a retention reinforcing portion extending from the end in a direction along which the buried portion extends.

The above introduced electrical connection parts reinforces the retention force with which the buried portion is retained by the resin to retain the buried portion since the electrical connection box has the retention reinforcing portion. By virtue of the retention reinforcing portion, the resin retains the buried portion 8 against the pulling force applied to the buried portion 8. Therefore, the exposure of the buried portion is efficiently prevented.

According to one or more illustrative aspects of the present invention, there is provided a method for manufacturing an electrical connection parts comprising steps of preparing a bus bar unit including a first bus bar, a second bus bar and a connecting portion, wherein the first bus bar includes a first buried portion which has an end, a first exposed portion extending from and at an angle with the end of the first buried portion, and a retention reinforcing portion extending from the end in a direction along which the first buried portion extends, the second bus bar includes a second exposed portion, and the connecting portion bridges the first and the second exposed portions; insert molding a resin case including a window so that the first and the second buried portions and the retention reinforcing portion are buried into the resin case and the first and the second exposed portions are exposed from the window; and cutting the connecting portion.

The above introduced method for manufacturing an electrical connection parts prevent the first buried portion from being exposed from the window since the method provides a bus bar having a retention reinforcing portion. The retention reinforcing portion reinforces the retention force with which the buried portion is retained by the resin to retain the buried portion inside the resin so that the buried portion is not exposed due to a force generated while the connecting portion is cut.

According to one or more illustrative aspects of the present invention, there is provided a bus bar unit comprising a first bus bar including a first portion which has a first end and a second end; a second portion extending from and at an angle with the first end of the first portion; a third portion extending from and at an angle with the second end of the first portion; a first protruding portion protruding from the first end in a direction along which the first portion extends; and a second protruding portion protruding from the second end in a direction along which the first portion extends.

The above introduced bus bar unit is used for manufacturing an electrical connection parts formed by incorporating a bus bar for an electrical path into a resin case by insert molding. By using the bus bar unit, it is prevented that a portion which should be buried in the resin case is exposed to the outside of the resin case during the manufacturing process.

BRIEF DESCRIPTION OF DRAWINGS

FIGS. 6A-6C are a view of a bus bar and a bus bar unit of the area A of FIG. 4; FIG. 6A depicts a top view of the area A and FIGS. 6B and 6C are side views of the area A shown in FIG. 6A.

DETAIL DESCRIPTION OF EXEMPLARY EMBODIMENTS OF THE PRESENT INVENTION

Figure 1:
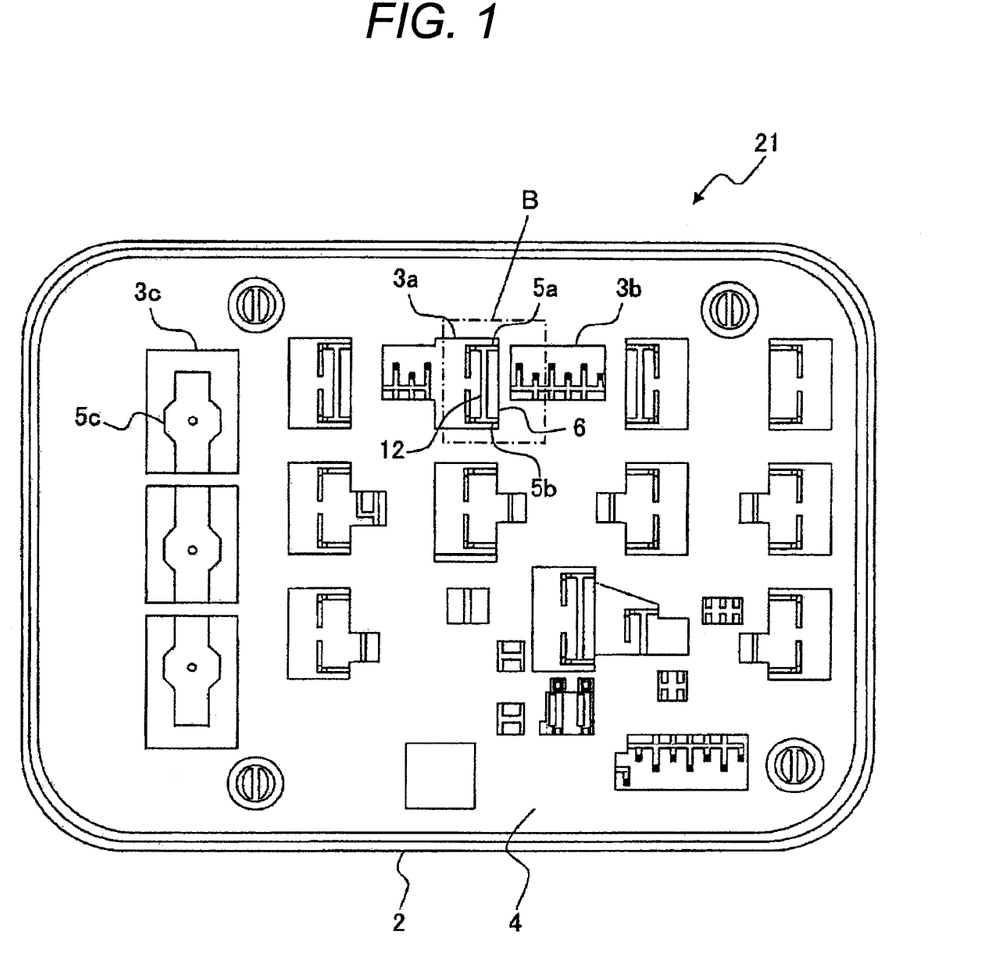
FIG. 1 is a simplified view of an electrical connection box as an exemplary embodiment of an electrical connection parts.
Figure 2:
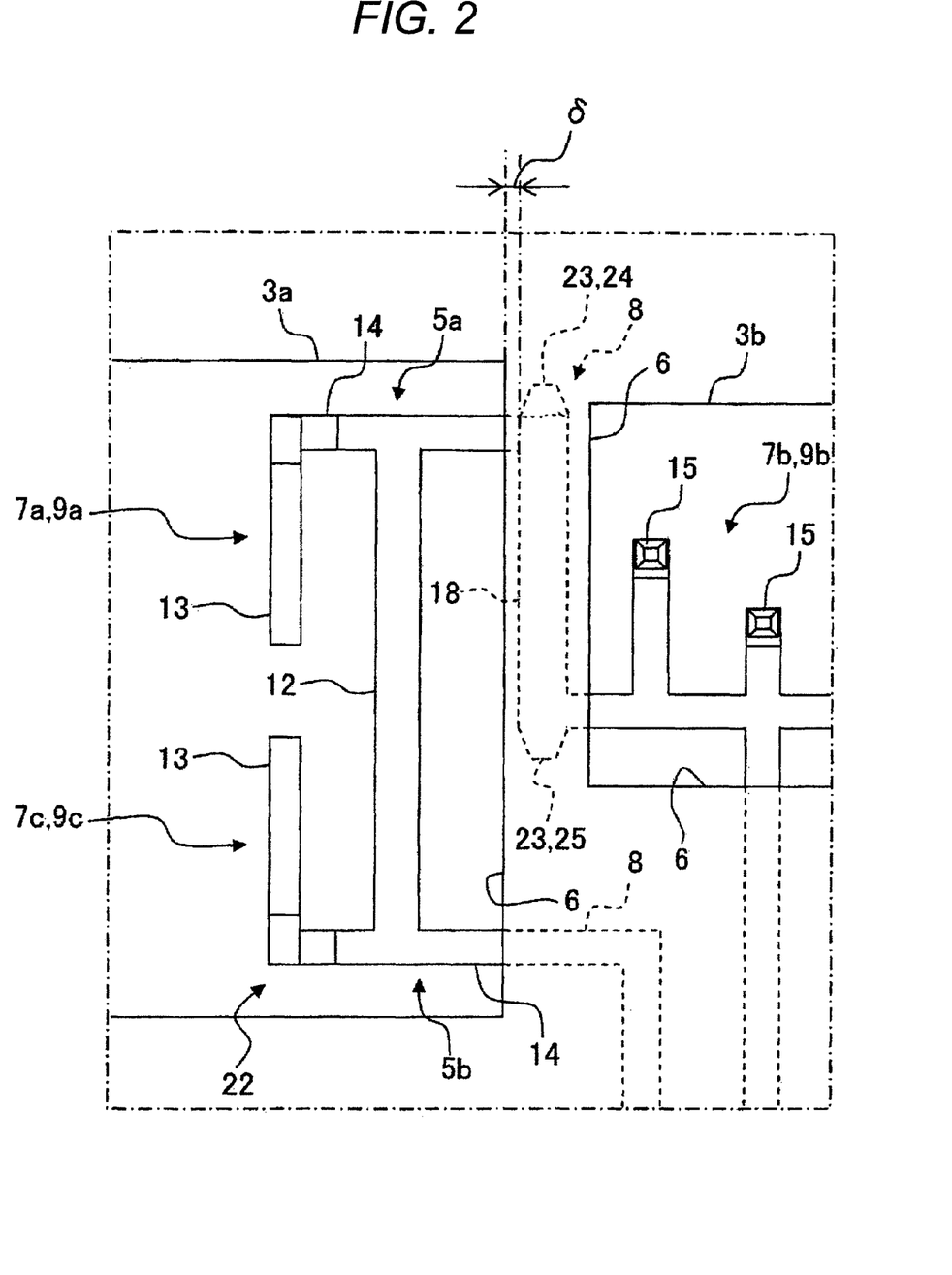
FIG. 2 is an expanded view of an area B of FIG. 1.
Figure 3:
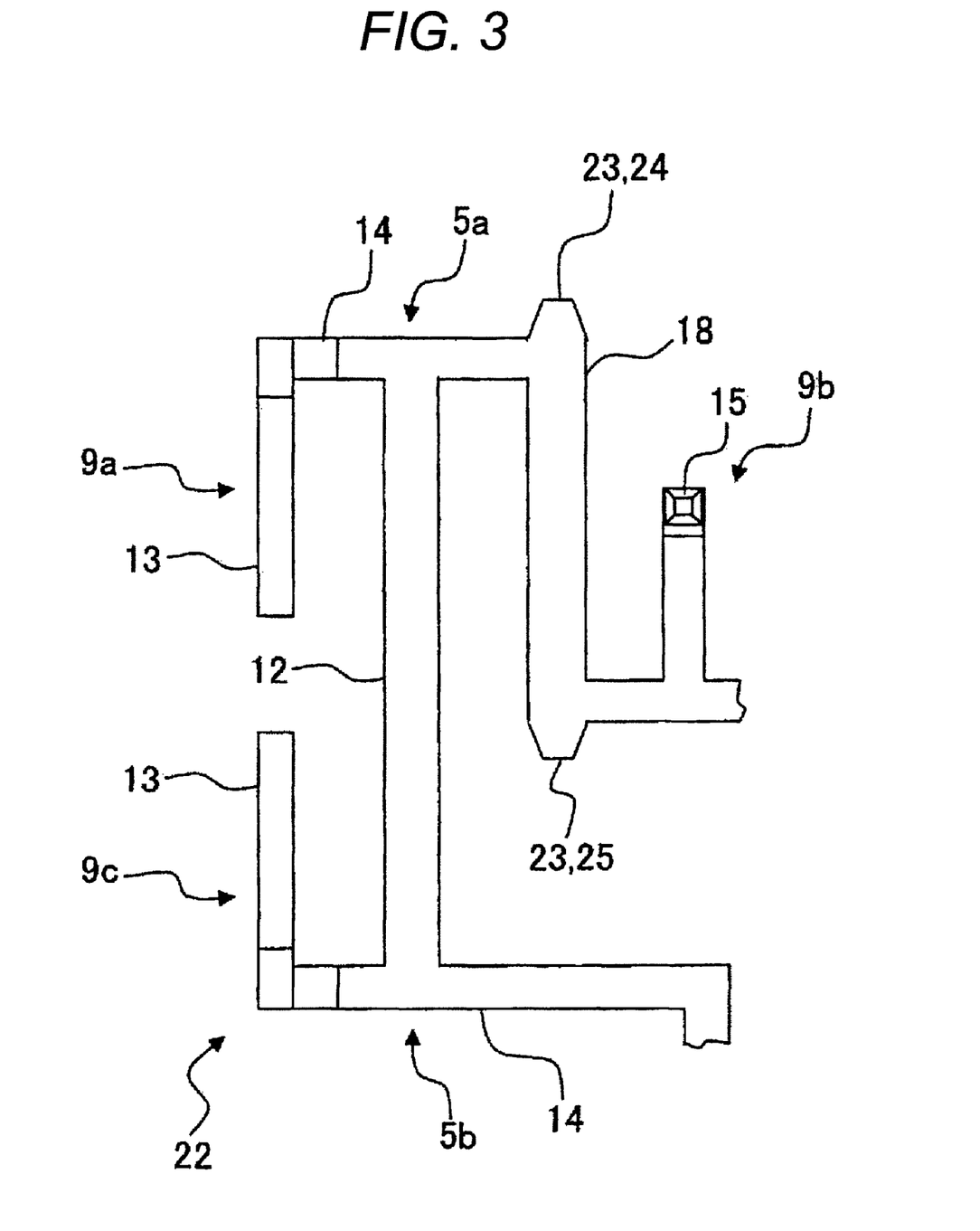
FIG. 3 is a view of a bus bar and a bus bar unit of the area B of FIG. 1.

An exemplary embodiment is explained below. A configuration of an electrical connection box 21 of an insert-molding-type electrical connection parts as an exemplary embodiment is shown in FIGS. 1 to 3. FIG. 1 is a plan view of the electrical connection box 21 as a whole, FIG. 2 is an expanded view of an area B of FIG. 1, and FIG. 3 is a view of a bus bar and a bus bar unit of the area B. The components of the electrical connection box 21 corresponding to the related electrical connection box are assigned same reference numbers and explanations for such components are omitted.

As shown in FIG. 2, the electrical connection box 21 includes a bus bar structure which has basically same configuration as that shown in FIG. 5. A bus bar unit 22 includes a buried portion 8 which continues to an orthogonal projection portion 14 of an exposed portion 7a of a bus bar 5a. The buried portion 8 includes a connection portion 18. The connection portion 18 is connected to the orthogonal projection portion 14 at a right angle and extended along the exposed projection edge 6 from which the orthogonal projection portion 14 is exposed to the window 3. The buried portion 8 is buried into the insert portion 4 while isolated from the exposed projection edge 6 by a resin with a resin thickness δ.

The bus bar unit 22 of such a bus bar structure includes a retention reinforcing portion 23 to reinforce the retention force with which the buried portion 8 is retained by the resin to retain the buried portion in the resin case 2. The retention reinforcing portion 23 is provided on the bus bar 5a in a vicinity of the connecting portion 12. More concretely, two ends of the connection portion 18 include a first extending portion 24 and a second extending portion 25 respectively as the retention reinforcing portion 23. The first and second extending portion 24, 25 extend from each edge in a direction along which the connection portion 18 extends.

The electrical connection box 21 reinforces the retention force with which the buried portion 8 is retained by the resin to retain the connection portion 18 of the buried portion 8 since the electrical connection box 21 has the retention reinforcing portion 23. By virtue of the retention reinforcing portion 23, the resin retains the buried portion 8 against the pulling force applied to the connection portion 18 of the buried portion 8 during the cut process for the connection portion 12. Therefore, the exposure of the connection portion 18 is efficiently prevented.

A retention reinforcing portion which serves as same as the retention reinforcing portion 23 may be provided at different positions of the bus bar structure from those described in FIG. 2. Explanations for such additional embodiments are omitted.

While the present invention has been shown and described with reference to certain exemplary embodiments thereof, it will be understood by those skilled in the art that various changes in form and details may be made therein without departing from the spirit and scope of the invention as defined by the appended claims.

The invention claimed is:

1. An electrical connection parts comprises:
    a resin case including a window; and
    a first bus bar including:
        a first buried portion buried in the resin case and having a first end and a second end;
        a first exposed portion that is exposed from the window, the first exposed portion having a projection portion extending from and at an angle with the first end of the first buried portion; and
        a retention reinforcing portion protruding from the first end in a direction along which the first buried portion extends.

2. The electrical connection parts according to claim 1, wherein the retention reinforcing portion is terminated inside of the resin.

3. The electrical connection parts according to claim 2, wherein the projection portion is perpendicular to the first buried portion.

4. The electrical connection parts according to claim 1 further comprises:
    a second bus bar including a second exposed portion; and
    a connecting portion which bridges the first exposed portion and the second exposed portion.

5. The electrical connection parts according to claim 4, wherein the connecting portion is in the vicinity of the retention reinforcing portion.

6. The electrical connection parts according to claim 4, wherein the projection portion of the first exposed portion and a projection portion of the second exposed portion are parallel to each other, and the connecting portion is perpendicular to each projection portion.

7. The electrical connection parts according to claim 1, wherein the first buried portion is isolated from the window by a resin wall.

8. The electrical connection parts according to claim 1, wherein the first buried portion is parallel to an edge of the window.

9. The electrical connection parts according to claim 8, wherein the projection portion is perpendicular to the first buried portion.

10. A method for manufacturing an electrical connection parts comprising steps of:
    preparing a bus bar unit including a first bus bar, a second bus bar and a connecting portion, wherein the first bus bar includes a first buried portion which has a first end and a second end, a first exposed portion having a projection portion extending from and at an angle with the first end of the first buried portion, and a retention reinforcing portion extending from the first end in a direction along which the first buried portion extends, a second bus bar includes a second exposed portion, and the connecting portion bridges the first and the second exposed portions;
    insert molding a resin case including a window so that the first buried portions and the retention reinforcing portion are buried into the resin case and the first and the second exposed portions are exposed from the window; and
    removing the connecting portion from the bus bar unit by cutting the connecting portion wherein the retention reinforcing portion prevents the first buried portion from being exposed from the window.

* * * * *